United States Patent [19]

Krstovic

[11] Patent Number: 5,285,824
[45] Date of Patent: Feb. 15, 1994

[54] VEHICLE OIL DRAINAGE APPARATUS AND METHOD

[76] Inventor: Alexander P. Krstovic, 104 Cindy La., Easley, S.C. 29642

[21] Appl. No.: 931,009

[22] Filed: Aug. 17, 1992

[51] Int. Cl.$^5$ ............................................. F16N 31/00
[52] U.S. Cl. ................................................ 141/1; 141/2; 141/98; 141/319; 184/1.5; 184/106; 220/573
[58] Field of Search .............................. 141/319–322, 141/98, 383, 384, 1, 2, 331, 334; 184/1.5, 106; 220/571, 571.1, 573

[56] References Cited

U.S. PATENT DOCUMENTS

| | | | |
|---|---|---|---|
| 3,667,573 | 6/1972 | Edwards | 184/1.5 |
| 4,022,257 | 5/1977 | O'Connell | 141/98 |
| 4,301,841 | 11/1981 | Sandow | 141/98 |
| 4,524,866 | 6/1985 | Pollacco | 141/98 X |
| 5,067,530 | 11/1991 | Short, III | 141/98 |
| 5,099,872 | 3/1992 | Tarvin et al. | 220/573 X |
| 5,190,085 | 3/1993 | Dietzen | 141/98 |

Primary Examiner—J. Casimer Jacyna
Attorney, Agent, or Firm—Ralph Bailey

[57] ABSTRACT

An oil drainage catch pan (A) having an open top (10) for receiving used engine oil drained therein has a reservoir (B) on one end of the pan with a discharge spout (C) and a container (D) connected by a coupling (E) to the spout. After collecting the used oil in the catch pan, the catch pan is tilted causing the used oil to flow to the reservoir and drain through the spout into the container for containment and transport to a suitable location.

2 Claims, 2 Drawing Sheets

VEHICLE OIL DRAINAGE APPARATUS AND METHOD

BACKGROUND OF THE INVENTION

This invention relates to an apparatus and method for draining used engine oil from vehicles and the like wherein a catch pan and a container are utilized for receiving and containing used oil for transport to a suitable location for disposal in an environmentally desirable fashion.

Used vehicle engine oil is a common source of contamination of soil and water, and its proper disposal is high on the list of environmental projects. Attempts to dispose of engine oil in a suitable fashion have been many and varied and have included the use of disposable containers which may be in the form of plastic bags. Drainage apparatus employing plastic bags is illustrated in U.S. Pat. No. 4,022,257 wherein the bag is received through an opening in the side of a collection funnel and the top of the bag is passed over the top of the funnel so as to avoid contamination of the funnel while containing the oil discharged from the vehicle into the funnel. Such an apparatus has the disadvantage of being difficult to manipulate when draining used engine oil during an oil change by one changing his own oil. The following U.S. Pat. Nos. further illustrate the state of the art: 4,025,048; 4,033,432; 4,269,237; 4,592,448; and 4,756,349.

SUMMARY OF THE INVENTION

Accordingly, an important object of this invention is to provide an improved apparatus and method facilitating an oil change especially when such is done by an individual rather than professionally.

It has been found that an oil drainage catch pan may be provided with a container into which the engine oil received into the catch pan may be readily discharged through the provision of a reservoir on one end of the pan. The method contemplates tilting the catch pan causing the oil to flow and collect in the reservoir, flow through a drainage opening and discharge through a spout which is provided in the reservoir to a container for transport to a desirable disposal location.

BRIEF DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein.

DESCRIPTION OF A PREFERRED EMBODIMENT

Figure 1:
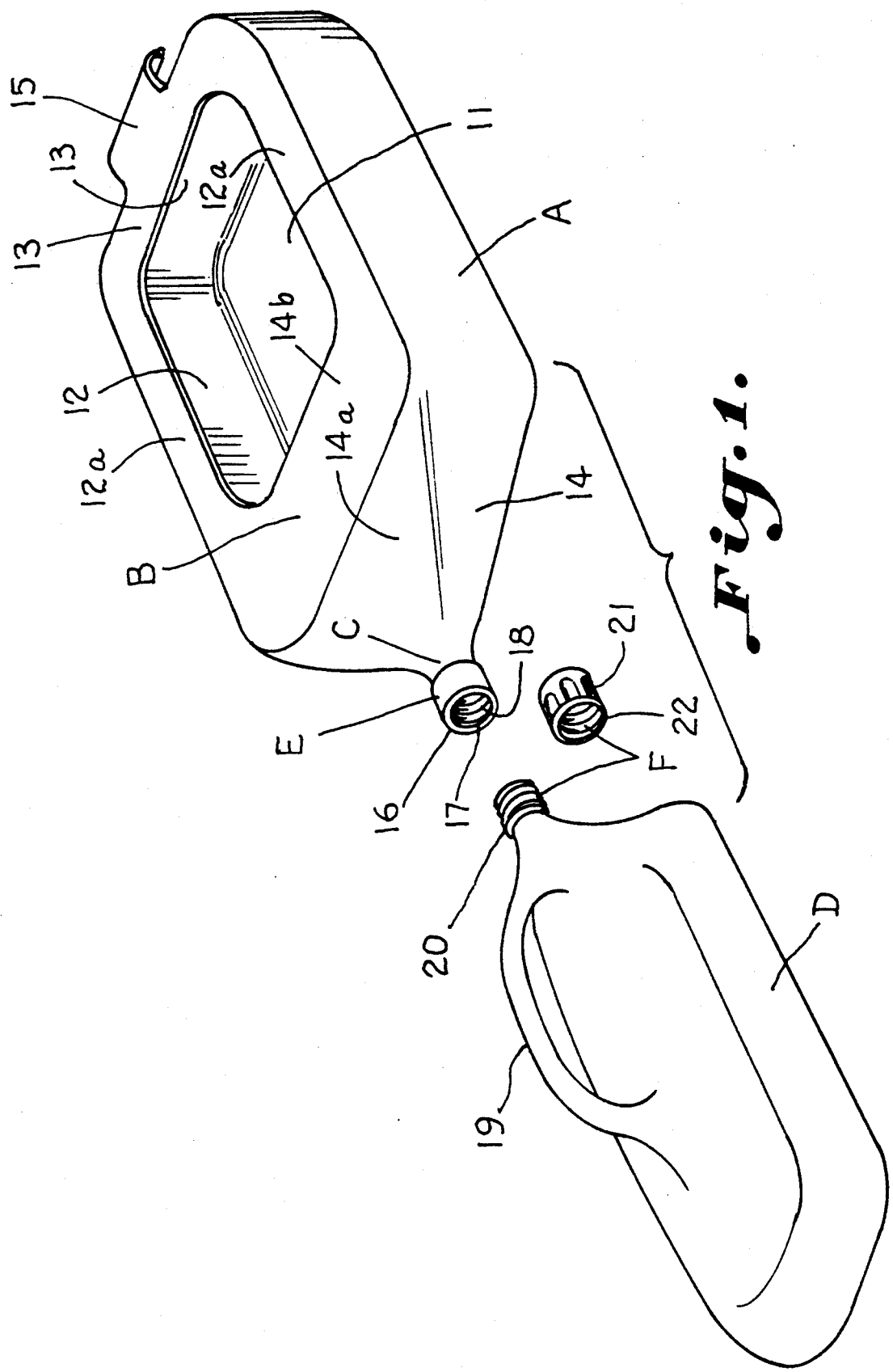
FIG. 1 is a perspective view illustrating a drainage catch pan with reservoir and container with closure means therefor constructed in accordance with the invention.
Figure 2:
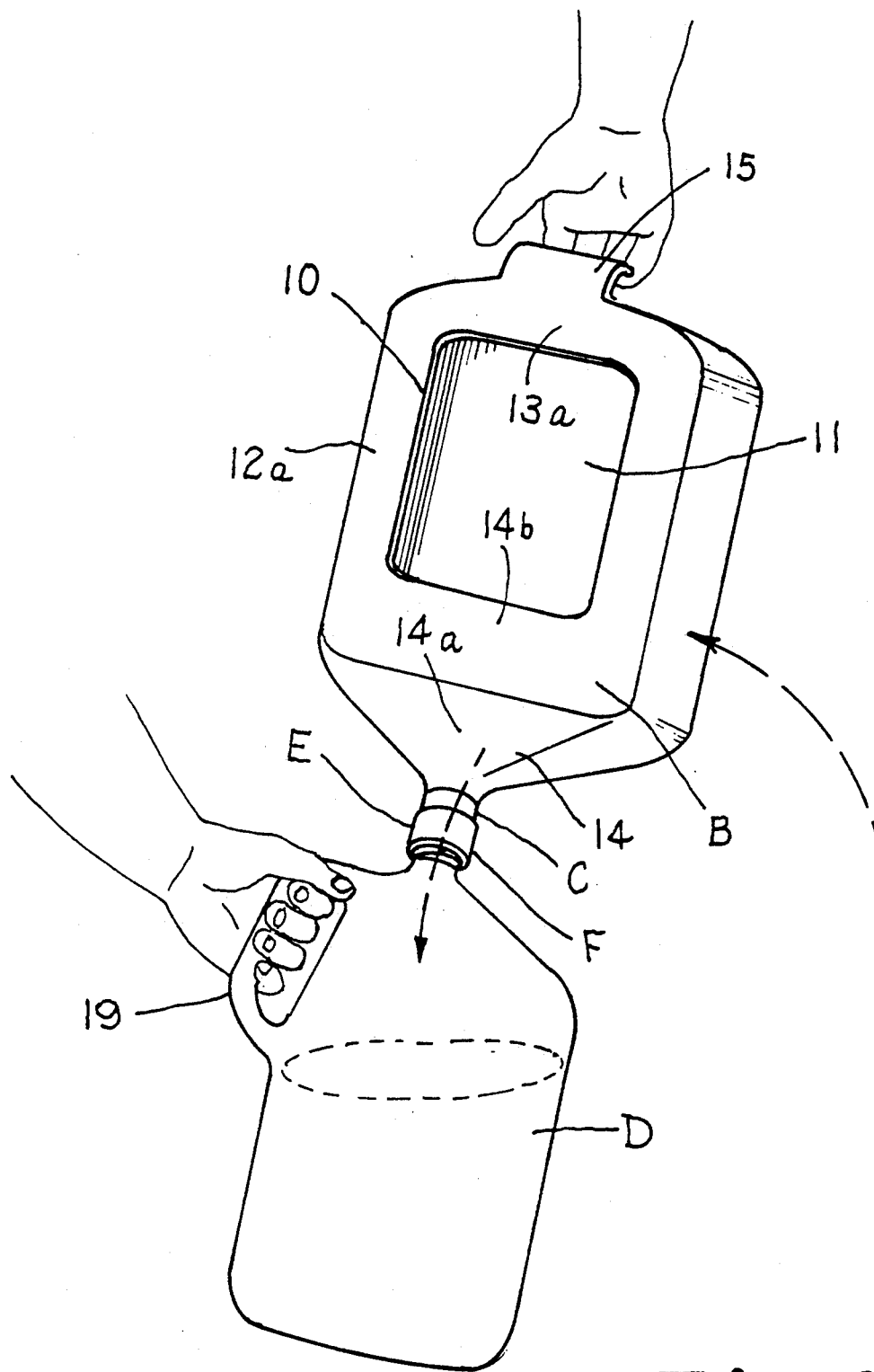
FIG. 2 is a perspective view illustrating the tilting of the catch pan illustrated in FIG. 1 causing oil to flow through the spout into the container.

The drawings illustrate a vehicle oil drainage apparatus including a catch pan A having an open top for receiving used engine oil drained therein from a vehicle. A reservoir B is provided on one end of the oil drainage catch pan. A discharge spout C is carried in the reservoir. A container D is provided for receiving and for containment of the used engine from the catch pan. A coupling E on the spout and on the container is joinable for permitting the flow of the used engine oil therethrough. A closure F is provided for the container for containment of the used engine oil. The catch pan may be tilted causing used engine oil to flow from the catch pan to the reservoir and thence through the spout to the container thus assuring transfer of substantially all the used engine oil to the container.

The catch pan A has an open top 10 for receiving used oil drained from a vehicle (not shown). The catch pan A also has a bottom 11, opposed sides 12 and an end wall 13. The sides 12 have inwardly extending overlying cover portions 12a for avoiding spillage. Likewise, the end 13 has an overlying portion 13a projecting inwardly and the reservoir B has an overlying inwardly projecting cover 14b.

A reservoir B is provided and forms an end of the catch pan A opposite the end wall 13. The reservoir B includes a generally funnel member 14 having inwardly tapering sides 14a which form a discharge spout C. A handle 15 is provided adjacent the end 13 of the oil drainage catch pan for convenience in tilting the catch pan when draining the oil therefrom for disposal. A coupling E includes a rotatable member 16 internally threaded as at 17 and which is carried for rotation on the discharge spout C. The spout and coupling E provide a passageway 18 for the flow of oil between the spout C and the container D. The container D may be provided with a handle 19 and has a threaded neck 20 which together with the cap 21 constitutes a closure for the container. The cap is internally threaded as at 22. The container D may be a flexible plastic bag and the like or it may be rigidly conformed in such a configuration as a bottle and the like. The catch pan and associated parts may likewise be constructed of any suitable plastic material such as polyethylene, polystyrene and the like and suitably formed as by injection molding.

It is thus noted that provision is made for assuring substantially complete drainage of a contaminant from the catch pan to the reservoir containing the spout and from thence unto a container for transport and disposal. Spent engine oil may be drained into the catch pan and then the catch pan removed from beneath the vehicle preparatory to coupling the container to the catch pan for tilting thereof for draining the oil therefrom into the container. It may also be desirable to connect the container to the catch pan prior to draining oil from the vehicle.

While a preferred embodiment of the invention has been described using specific terms, such description is for illustrative purposes only, and it is to be understood that changes and variations may be made without departing from the spirit or scope of the following claims.

What is claimed is:

1. The method of draining used engine oil from a vehicle comprising the steps of:
   providing a catch pan and reservoir for containing oil when the catch pan is in tilted position at one end of the catch pan;
   providing a tubular connector coupled on one end to a container and to said reservoir on the other end establishing a tubular passageway open for oil flow between the container and the reservoir;

opening the drainage plug of a vehicle permitting used oil to drain into the catch pan for retention therein in a level position wherein oil will not flow into the container;

tilting said catch pan and reservoir into upright position by elevating an end of said catch pan remote from said reservoir and said container thereby causing the used oil to flow through the passageway into the reservoir, thence through the passageway and into the container by the act of tilting said catch pan, reservoir and container;

disconnecting a coupling joining said reservoir to said container; and closing the container for containment of the oil for transport to a suitable location.

2. The method set forth in claim 1 including the step of providing a handle at said remote end of said catch pan for lifting said remote end tilting said catch pan, reservoir and container.

* * * * *